(No Model.) 2 Sheets—Sheet 1.

G. M. NEWHALL.
APPARATUS FOR STIRRING, MIXING, AND MELTING SUGAR, &c.

No. 276,065. Patented Apr. 17, 1883.

WITNESSES:
Harry Drury
Hamilton D. Turner

INVENTOR:
G. M. Newhall
by his attys.
Howson and Sons (No Model.)  2 Sheets—Sheet 2.

G. M. NEWHALL.
APPARATUS FOR STIRRING, MIXING, AND MELTING SUGAR, &c.

No. 276,065.  Patented Apr. 17, 1883.

WITNESSES:
Harry Drury
Hamilton D. Turner

INVENTOR:
G. M. Newhall
by his att'ys
Howson and Son

UNITED STATES PATENT OFFICE.

GEORGE M. NEWHALL, OF PHILADELPHIA, PENNSYLVANIA.

APPARATUS FOR STIRRING, MIXING, AND MELTING SUGAR, &c.

SPECIFICATION forming part of Letters Patent No. 276,065, dated April 17, 1883.

Application filed February 12, 1883. (No model.)

*To all whom it may concern:*

Be it known that I, GEORGE M. NEWHALL, a citizen of the United States, and a resident of Philadelphia, Pennsylvania, have invented certain Improvements in Apparatus for Stirring, Mixing, and Melting Sugar and Similar Substances, of which the following is a specification.

The main feature of my invention consists of the combination of a vessel with a stirrer composed principally of steam-heated tubes for the purpose of thoroughly mixing the contents of the vessel, maintaining its contents at a uniform temperature, and obtaining uniform solutions of sugar and other substances.

My invention further consists in combining the vessel and stirrer with a receptacle in which foreign insoluble matter may be deposited by the action of the said stirrer, and thus separated from the contents of the vessel.

Further features of my invention will be fully described hereinafter.

Figure 1:
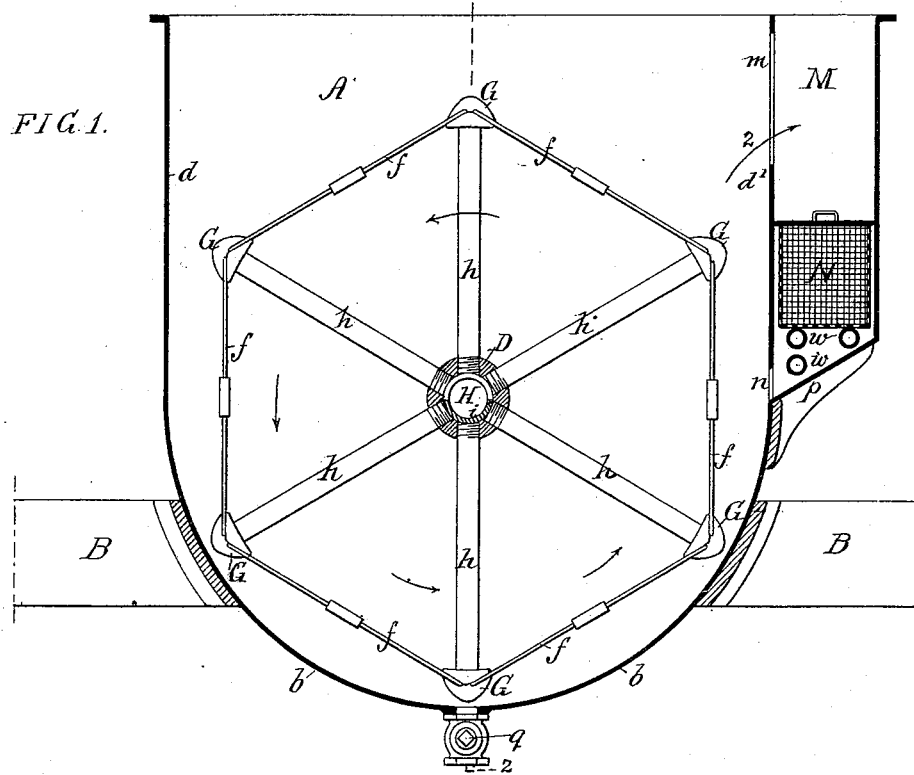
Figure 2:
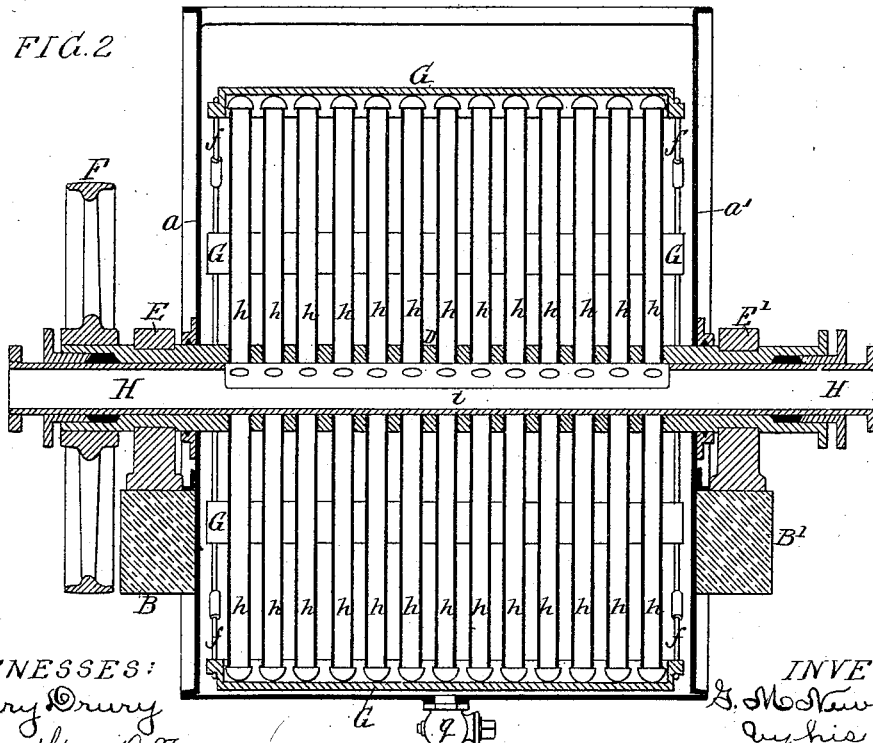
Figure 3:
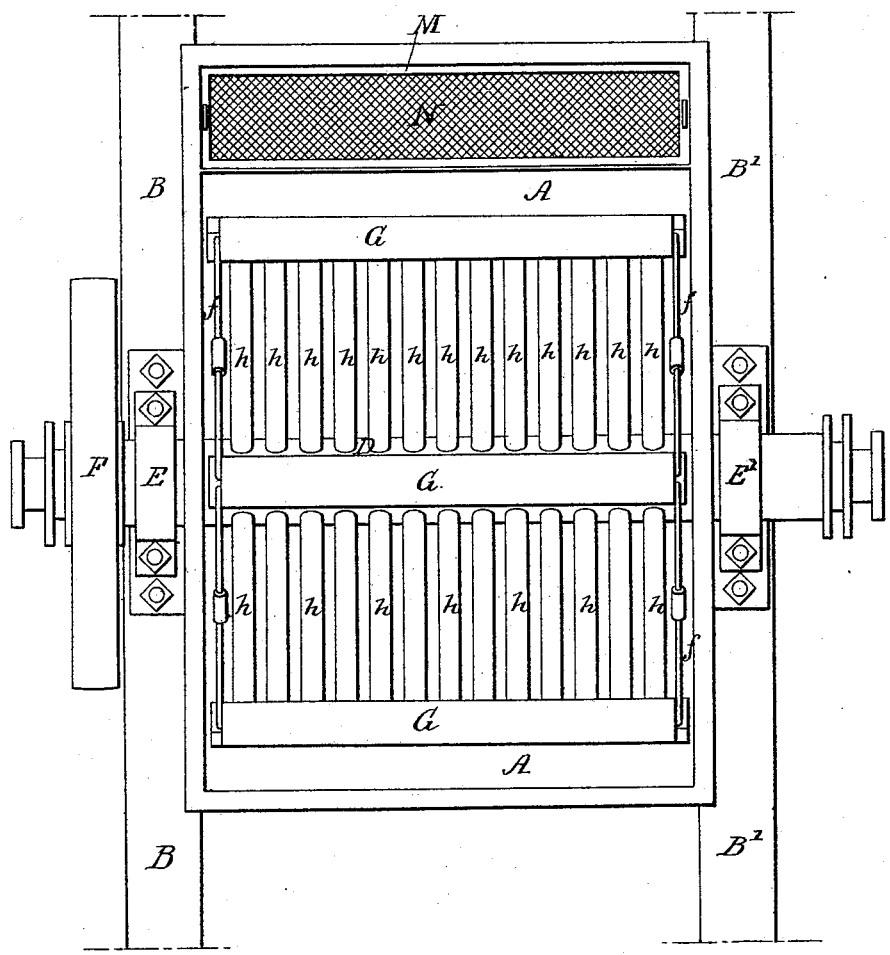

In the accompanying drawings, Figure 1, Sheet 1, is a vertical section of apparatus for carrying my invention into effect; Fig. 2, a transverse vertical section on the line 1 2; and Fig. 3, Sheet 2, a plan view.

A vessel, A, having a semi-cylindrical bottom, $b$, merging into the vertical ends $d\ d'$, and having opposite flat sides $a\ a'$, is secured to any suitable frame-work or foundation, in the present instance to the beams B B'.

A tubular shaft, D, concentric, or nearly so, with the base of the vessel, extends through the latter, and has journals adapted to bearings E E', which are secured to the beams B B', the shaft being driven by a belt passing round a pulley, F, or by any suitable system of gearing.

A series of tubes, $h$, within the vessel A, are secured to, radiate from, and communicate with the tubular shaft, there being in the present instance six rows of these tubes and ten tubes in each row; but the number of sets of tubes and the number of tubes in each set may be varied. The tubes of each row are closed at their outer ends, and a hollow bar or hood, G, extends across the ends of each row of tubes, the several hoods being connected together by rods $f$ to impart rigidity to the stirrer.

A stationary pipe, H, communicating at one end with any neighboring steam-generator and at the opposite end with a suitable discharge-pipe, passes through stuffing-boxes at the ends of the tubular shaft. A portion of the pipe H, which extends into the tubular shaft, is open at the top, so as to form the trough $i$.

At one end of the vessel, and communicating therewith through openings $m$ and $n$, is a receptacle, M, which contains a removable basket, N, preferably made of wire gauze or netting, and supported on ledges within the receptacle, the bottom $p$ of which is preferably inclined to the lower edge of the opening $n$. I also prefer to introduce into the receptacle, beneath the basket, steam-heated pipes $w$, for a purpose rendered apparent hereinafter.

While the above-described apparatus may be used for obtaining solutions of salts and other crystalline substances and for dissolving gummy or resinous substances—as, for instance, in the manufacture of varnish and for thoroughly mixing liquids—it has been more especially designed for obtaining saccharine solutions. Hence in describing the operation of the apparatus I will refer to its action in the last-named connection.

The crude sugar, which always contains more or less insoluble foreign matter—such as sand, mud, and chips of cane—is placed with a supply of water in the vessel A, and the stirrer is revolved in the direction of the arrows, Fig. 1.

All parts of the mass are maintained at the same temperature and density by the steam-heated stirrer, which revolves as close as possible to the bottom of the vessel without coming into actual contact therewith. There must necessarily be a persistent current of the contents of the vessel in the direction pointed out by the arrows, and this, together with the movement of the cross-bars or hoods G of the stirrer so near to the bottom of the vessel, prevents the accumulation of sediment therein.

It may be here remarked that the presence of sand and other insoluble foreign matters in saccharine solutions is a serious evil in filtration.

As the stirrer is rotated in the direction pointed out the particles of insoluble foreign matter are carried upward, and have a tendency to pass in the direction of the arrow 2 through the opening $m$ into the receptacle M, where they are caught by the basket N, accompanied with more or less of the solution, which is drained off from the basket, and returns to the main vessel A through the opening $n$. More or less undissolved sugar will also find its way into the basket; hence the steam-pipes $w$ below the same, the heat imparted at this point, together with the "wash" or eddy of sirup caused at intervals to pass through the opening $n$ as the stirrer revolves, tending to dissolve the sugar trapped in the basket.

When a thorough solution, free, or nearly so, from foreign matter, has been obtained the rotation of the stirrer is discontinued, the contents of the vessel drawn off through the cock $q$, and the basket is emptied and cleaned, being, if desired, removed from the receptacle for this purpose.

When the apparatus has to be used for obtaining solutions of substances which are in a pure condition and free from foreign matter, or when it has to be used for simply mixing different fluids together cold or under the influence of heat, the basket in the receptacle M may be dispensed with. As the stirrer revolves, whatever water of condensation may be in the tubes will be discharged from the latter into the trough $i$, and pass with waste steam through the pipe H, which is furnished at its outer end with a suitable steam trap or cock to allow the water of condensation to escape.

The hollow cross-bars or hoods G aid in effecting the thorough admixture of the liquids in the vessel, as said hoods form elongated cups, which as they rise carry the dense liquid from the bottom of the vessel and discharge it into the lighter liquid above, and as they descend carry down portions of this lighter liquid into the dense liquid below. The hoods G also prevent any hard foreign matters in the bottom of the vessel from striking and straining any one of the tubes $h$—an accident which might happen in the absence of the hoods.

In carrying out my invention it is not necessary to adhere to the precise construction of the parts shown, as changes from that construction without departing from the main features of my invention will readily suggest themselves to expert mechanics.

I claim as my invention—

1. The combination of a vessel, A, having a semi-cylindrical bottom, with a stirrer composed of a hollow shaft concentric, or thereabout, with the said bottom of the vessel, and having rows of steam-heated tubes radiating from the shaft, the tubes of each row being connected together by cross-bars, all substantially as set forth.

2. The combination of the vessel A, a stirrer, B, composed mainly of steam-heated tubes, with a receptacle, M, provided with a removable basket and communicating with the main vessel A, all substantially as specified.

3. The combination of the vessel A and its stirrer with the receptacle M, basket N, and steam heating pipes $w$ below the basket, substantially as specified.

4. The combination of the tubular shaft and its tubes $h$ with a pipe, H, made trough-shaped throughout a portion of its length, substantially as specified.

5. The combination of the rows of radiating tubes composing the arms of the stirrer with the hollow cross-bars or hoods G, as set forth.

In testimony whereof I have signed my name to this specification in the presence of two subscribing witnesses.

GEORGE M. NEWHALL.

Witnesses:
HARRY DRURY,
HARRY SMITH.